(12) United States Patent
Skovby et al.

(10) Patent No.: US 9,598,295 B2
(45) Date of Patent: Mar. 21, 2017

(54) MICRONIZED CACO₃ SLURRY INJECTION SYSTEM FOR THE REMINERALIZATION OF DESALINATED AND FRESH WATER

(75) Inventors: Michael Skovby, Meilen (CH); Martine Poffet, Uettligen (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/129,313

(22) PCT Filed: Jul. 17, 2012

(86) PCT No.: PCT/EP2012/063973
§ 371 (c)(1),
(2), (4) Date: Feb. 24, 2014

(87) PCT Pub. No.: WO2013/014026
PCT Pub. Date: Jan. 31, 2013

(65) Prior Publication Data
US 2015/0037463 A1 Feb. 5, 2015

Related U.S. Application Data

(60) Provisional application No. 61/513,035, filed on Jul. 29, 2011.

(30) Foreign Application Priority Data

Jul. 22, 2011 (EP) .................... 11175012

(51) Int. Cl.
*A23L 1/304* (2006.01)
*C02F 1/68* (2006.01)
(Continued)

(52) U.S. Cl.
CPC ............ *C02F 1/68* (2013.01); *C01B 5/00* (2013.01); *C02F 1/001* (2013.01); *C02F 1/008* (2013.01);
(Continued)

(58) Field of Classification Search
CPC ...... C02F 51/68; C02F 2209/245; C02F 5/06; C02F 5/083; C02F 2103/06
(Continued)

(56) References Cited

U.S. PATENT DOCUMENTS 3,833,463 A 9/1974 Croom
5,863,422 A 1/1999 Watten
(Continued)

FOREIGN PATENT DOCUMENTS

EP 0520826 A1 12/1992
EP 1974806 A1 10/2008
(Continued)

OTHER PUBLICATIONS

International Search Report dated Sep. 17, 2012 for PCT Application No. PCT/EP2012/063973.
(Continued)

*Primary Examiner* — Helen F Heggestad
(74) *Attorney, Agent, or Firm* — Amster, Rothstein & Ebenstein LLP (57) ABSTRACT

The present invention concerns a process for treating water and the use of calcium carbonate in such a process. In particular, the present invention is directed to a process for remineralization of water comprising the steps of (a) providing feed water having a concentration of carbon dioxide of at least 20 mg/l, preferably in a range of 25 to 100 mg/l, and more preferably in a range of 30 to 60 mg/l, (b) providing an aqueous slurry comprising micronized calcium carbonate, and (c) combining the feed water of step (a) and the aqueous slurry of step (b) in order to obtain remineralized water.

33 Claims, 1 Drawing Sheet (51) Int. Cl.
  *C01B 5/00*    (2006.01)
  *C02F 1/00*    (2006.01)
  *C02F 1/44*    (2006.01)
  *C02F 103/00*  (2006.01)
  *C02F 103/02*  (2006.01)
  *C02F 103/08*  (2006.01)

(52) U.S. Cl.
  CPC ........ *C02F 1/444* (2013.01); *C02F 2001/007* (2013.01); *C02F 2103/001* (2013.01); *C02F 2103/02* (2013.01); *C02F 2103/08* (2013.01); *C02F 2209/003* (2013.01); *C02F 2209/05* (2013.01); *C02F 2209/055* (2013.01); *C02F 2209/06* (2013.01); *C02F 2209/07* (2013.01); *C02F 2209/10* (2013.01); *C02F 2209/11* (2013.01); *C02F 2209/24* (2013.01); *C02F 2301/043* (2013.01)

(58) Field of Classification Search
  USPC .............................................. 426/74, 66, 67
  See application file for complete search history.

(56) References Cited

U.S. PATENT DOCUMENTS

| | | | |
|---|---|---|---|
| 5,914,046 | A | 6/1999 | Watten |
| 5,993,737 | A * | 11/1999 | Mackintosh et al. ........... 422/14 |
| 6,666,953 | B1 | 12/2003 | Gane et al. |
| 7,374,694 | B2 * | 5/2008 | Gaudinot et al. ............. 210/752 |
| 2004/0020410 | A1 | 2/2004 | Gane et al. |
| 2004/0028792 | A1 | 2/2004 | Jauffret et al. |
| 2010/0086987 | A1 | 4/2010 | Gane et al. |
| 2011/0097311 | A1 | 4/2011 | Di Maiuta et al. |
| 2013/0123369 | A1 | 5/2013 | Di Maiuta et al. |

FOREIGN PATENT DOCUMENTS

| | | |
|---|---|---|
| EP | 1974807 A1 | 10/2008 |
| EP | 1975310 A1 | 10/2008 |
| EP | 1982759 A1 | 10/2008 |
| EP | 2108260 A2 | 10/2009 |
| EP | 2418177 A1 | 2/2012 |
| EP | 2583555 A1 | 4/2013 |
| JP | 6058294 A | 4/1985 |
| JP | 6178493 A | 4/1986 |
| JP | 0478488 A | 3/1992 |
| JP | 06015477 A | 1/1994 |
| JP | 2568299 B2 | 12/1996 |
| JP | 2003231371 A | 9/2003 |
| RU | 2444193 C1 | 3/2012 |
| SU | 1412232 A | 9/1990 |
| WO | 0039222 A1 | 7/2000 |
| WO | 2009124871 A2 | 10/2009 |
| WO | 2010/012691 * | 2/2010 |
| WO | 2010012691 * | 2/2010 |
| WO | 2010012691 A1 | 2/2010 |
| WO | 2012020056 A1 | 2/2012 |

OTHER PUBLICATIONS

Written Opinion of the International Searching Authority dated Sep. 17, 2012 for PCT Application No. PCT/EP2012/063973.
Office Action dated Oct. 17, 2014 for Colombian Application No. CO 13-26648.
Office Action dated Oct. 27, 2014 for Chinese Application No. 201280036255.2.
English Translation of Office Action dated Aug. 4, 2015 for SG 2013095955.
English Translation of the Grant Decision for RU 2014106702, date not available.
English Translation of the Office Action for RU 2014106702. Sep. 8, 2016.
English Translation of the Office Action dated Sep. 1, 2015 for KR 10-2014-7001914.
English Translation of the Office Action dated Dec. 2, 2015 for TW 101125038.
Examination Report dated Jan. 4, 2016 for GC 2012-21798.
Water Preparation: A Handbook for Professionals, Ed. by Belikov, S.E., Moscow: Akva-Term, 2007, pp. 18, 111 and 136.
Office Action for Colombian Application No. CO 13-26648. Oct. 17, 2014.
Office Action dated Apr. 28, 2105 for Canadian Application No. 2,840,529.
Pakistan Office Action (Database WPI week 199117 Thomson Scientific, London, GB; an 1991-123552 X002659862 and Su 1412232 (Baranov Yu S) Sep. 15, 1990).
Office Action dated Apr. 20, 2015 for Australian Application No. 2012289016.
Office Action dated Apr. 7, 2015 for Japanese Application No. 2014-522032.
Office Action dated Oct. 21, 2014 for New Zealand Application No. 621402.
Office Action for Chinese Application No. 201280036255.2. Oct. 27, 2014.
European Search Report dated Oct. 5, 2011 for Application No. EP11175012.1.

\* cited by examiner

Fig. 1

MICRONIZED CACO₃ SLURRY INJECTION SYSTEM FOR THE REMINERALIZATION OF DESALINATED AND FRESH WATER

CROSS-REFERENCE TO RELATED APPLICATIONS

This application is a U.S. national phase of PCT Application No. PCT/EP2012/063973, filed Jul. 17, 2012, which claims priority to European Application No. 11175012.1, filed Jul. 22, 2011 and U.S. Provisional Application No. 61/513,035, filed Jul. 29, 2011.

The invention relates to the field of water treatment, and more specifically to a process for remineralization of water and the use of calcium carbonate in such a process.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of seawater, brine, brackish waters, waste waters and contaminated effluent waters is gaining more and more importance for environmental and economic reasons.

In order to recover water from seawater or brackish water, for potable usages, several processes are known, which are of considerable importance for dry areas, coastal regions and sea islands, and such processes comprise distillation, electrolytic as well as osmotic or reverse osmotic processes. The water obtained by such processes is very soft and has a low pH value because of the lack of pH-buffering salts, and thus, tends to be highly reactive and unless treated, it can create severe corrosion difficulties during its transport in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to remineralize the water.

Conventional processes that are mainly used for the remineralization of water are lime dissolution by carbon dioxide and limestone bed filtration. Other, less common remineralization processes, comprise, e.g., the addition of hydrated lime and sodium carbonate, the addition of calcium sulfate and sodium bicarbonate, or the addition of calcium chloride and sodium bicarbonate.

The lime process involves treatment of lime solution with $CO_2$ acidified water, wherein the following reaction is involved:

As can be gathered from the above reaction scheme, two equivalents of $CO_2$ are necessary to convert one equivalent of $Ca(OH)_2$ into $Ca^{2+}$ and bicarbonate for remineralization. This method is dependent on the addition of two equivalents of $CO_2$, in order to convert the basic anion hydroxide into the buffering bicarbonate species. For the remineralization of water, a saturated calcium hydroxide solution, commonly named lime water, of 0.1-0.2 wt.-% based on the total weight, is prepared from a lime milk (usually at most 5 wt.-%). Therefore a saturator to produce the lime water must thereof be used and large volumes of lime water are necessary to achieve the target level of remineralization. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing the soft water through a bed of granular limestone dissolving the calcium carbonate in the water flow. Contacting limestone with $CO_2$ acidified water mineralizes the water according to:

Unlike the lime process, only one equivalent of $CO_2$ is stoichiometrically necessary to convert one equivalent of $CaCO_3$ into $Ca^{2+}$ and bicarbonate for remineralization. Moreover, limestone is not corrosive and due to the buffering properties of $CaCO_3$ major pH shifts are prevented.

One additional advantage of using calcium carbonate instead of lime is its very low carbon dioxide footprint. In order to produce one ton of calcium carbonate 75 kg of $CO_2$ is emitted, whereas 750 kg of $CO_2$ is emitted for the production of one ton of lime. Therefore the use of calcium carbonate instead of lime presents some environmental benefits.

However, the dissolution rate of granular calcium carbonate is slow and large filters are needed for the limestone filtration process. That causes a sizeable footprint of these filters, and large plant surfaces are required for such limestone bed filtration systems.

Methods for remineralization of water using lime milk or a slurry of lime are described in U.S. Pat. No. 7,374,694 and EP 0 520826. U.S. Pat. No. 5,914,046 describes a method for reducing the acidity in effluent discharges using a pulsed limestone bed.

The applicant also knows unpublished European Patent Application 10 172 771.7 describing a method for the remineralization of desalinated and fresh water by injecting micronized calcium carbonate slurry and gaseous carbon dioxide in feed water.

However, all of the above cited prior art documents describe processes for the remineralization of feed water containing no or a low concentration of carbon dioxide before the remineralization process.

Yet, there also exists feed water having a high or sufficient concentration of carbon dioxide before the remineralization process, based on the level or remineralization wanted. By a high or sufficient concentration of carbon dioxide it is meant an amount of at least 20 mg $CO_2$ per liter of feed water.

One type of feed water having such a high concentration of carbon dioxide is ground water originating from water that has been percolating through calcareous rocks or due to anaerobic conditions.

Another type of feed water having a concentration of carbon dioxide of at least 20 mg/l, can for example be found during the treatment of waste water in a sewage plant. The reason therefor is that one treatment step of the waste water consists in the desalination of the waste water by the use of reverse osmosis. However, in order to prevent or reduce scale formation on the membranes of the reverse osmosis apparatus, acid, in particular sulfuric acid is added to the reverse osmosis feed water in order to lower the pH. The addition of acid in the reverse osmosis feed leads to a conversion of the carbonate species in the feed water to free carbon dioxide which is not removed by the membranes of the reverse osmosis apparatus and thus is present in the feed water leaving the osmosis apparatus. This excess carbon dioxide present in the feed water, however, has to be removed before the addition of lime. At present, the removal of the excess carbon dioxide in the feed water is carried out by using cost-, time- and energy consuming decarbonators.

Thus, considering the drawbacks of the known processes for remineralization of water, it is an object of the present invention to provide an alternative or improved process for remineralization of water having an initial concentration of carbon dioxide of at least 20 mg/l, and where the remineralized water has a defined level of remineralization, for example a calcium concentration of 30 to 40 mg/l as $CaCO_3$.

Another object of the present invention is to provide a process for the remineralization of water that does not require a corrosive compound, and thus, avoids the danger of incrustation, eliminates the need for corrosion resistant equipment, and provides a safe environment for people working in the plant. It would also be desirable to provide a process that is environmental friendly and that reduces the operational costs due to the omission of a time-, energy- and cost consuming process step Another object of the present invention is to provide a process for remineralization of water, wherein the amount of minerals can be adjusted to the required values.

Another object of the present invention is to provide a process for remineralization using limestone that allows the use of smaller remineralization units, or to provide a remineralization process that allows the use of smaller volumes of the remineralization compound, for instance, in comparison with the lime process. It would also be desirable to provide a process that can be operated on smaller plant surfaces than the limestone bed filtration process.

The foregoing and other objects are solved by the provision of a process for remineralization of water comprising the steps of (a) providing feed water having a concentration of carbon dioxide of at least 20 mg/l, preferably in a range of 25 to 100 mg/l, and more preferably in a range of 30 to 60 mg/l, (b) providing an aqueous slurry comprising micronized calcium carbonate, and (c) combining the feed water of step a) and the aqueous slurry of step b) in order to obtain remineralized water.

According to another aspect of the present invention, a use of a micronized calcium carbonate for remineralization of water is provided.

Advantageous embodiments of the present invention are defined in the corresponding sub-claims.

According to one embodiment the concentration of calcium carbonate in the slurry is from 0.05 to 40 wt.-%, from 1 to 25 wt.-%, from 2 to 20 wt.-%, preferably from 3 to 15 wt.-%, and most preferably from 5 to 10 wt.-% based on the total weight of the slurry, or the concentration of calcium carbonate in the slurry is from 10 to 40 wt.-%, from 15 to 30 wt.-%, or from 20 to 25 wt.-% based on the total weight of the slurry. According to another embodiment the calcium carbonate has a particle size from 0.1 to 100 μm, from 0.5 to 50 μm, from 1 to 15 μm, preferably from 2 to 10 μm, most preferably 3 to 5 μm, or the calcium carbonate has a particle size from 1 to 50 μm, from 2 to 20 μm, preferably from 5 to 15 μm, most preferably 8 to 12 μm. According to still another embodiment the calcium carbonate has a HCl insoluble content from 0.02 to 2.5 wt.-%, 0.05 to 1.5 wt.-%, or 0.1 to 0.6 wt.-% based on the total weight of the micronized calcium carbonate. According to still another embodiment the calcium carbonate is a ground calcium carbonate, modified calcium carbonate, or precipitated calcium carbonate, or mixtures thereof.

According to one embodiment the slurry comprises further minerals containing magnesium, potassium or sodium, preferably magnesium carbonate, calcium magnesium carbonate, e.g. dolomitic limestone, calcareous dolomite, dolomite or half-burnt dolomite; magnesium oxide such as burnt dolomite, magnesium sulfate, potassium hydrogen carbonate, or sodium hydrogen carbonate. According to another embodiment the slurry is freshly prepared by mixing water and the calcium carbonate. According to still another embodiment the time period between the preparation of the slurry and the injection of the slurry is less than 48 hours, less than 24 hours, less than 12 hours, less than 5 hours, less than 2 hours or less than 1 hour. According to still another embodiment the injected slurry meets microbiological quality requirements specified by the national guidelines for drinking water.

According to one embodiment the obtained remineralized water has a calcium concentration as calcium carbonate from 15 to 200 mg/l, preferably from 50 to 150 mg/l, and most preferred from 100 to 125 mg/l, or from 15 to 100 mg/l, preferably from 20 to 80 mg/l, and most preferably from 40 to 60 mg/l.

According to another embodiment the obtained remineralized water has a magnesium concentration from 5 to 25 mg/l, preferably from 5 to 15 mg/l, and most preferred from 8 to 12 mg/l. According to still another embodiment the remineralized water has a turbidity value of lower than 5.0 NTU, lower than 1.0 NTU, lower than 0.5 NTU, or lower than 0.3 NTU.

According to another preferred embodiment the remineralized water has a Langelier Saturation Index from −2 to 1, preferably from −1.9 to 0.9, and most preferably from −0.9 to 0. According to still another embodiment the remineralized water has a Slit Density Index $SDI_{15}$ below 5, preferably below 4, and most preferred below 3. According to still another embodiment the remineralized water has a Membrane Fouling Index $MFI_{0.45}$ below 4, preferably below 2.5, most preferred below 2.

According to one embodiment the feed water is desalinated seawater, brackish water or brine, treated wastewater or natural water such as ground water, surface water or rainfall, and preferably desalinated seawater, brackish water or brine, treated wastewater or ground water.

According to one embodiment the remineralized water is blended with feed water. According to another embodiment the process further comprises a particle removal step.

According to one embodiment the process further comprises the steps of (d) measuring a parameter value of the remineralized water, wherein the parameter is selected from the group comprising alkalinity, total hardness, conductivity, calcium concentration, pH, $CO_2$ concentration, total dissolved solids, and turbidity of the remineralized water, (e) comparing the measured parameter value with a predetermined parameter value, and (f) providing the amount of injected slurry on the basis of the difference between the measured and the predetermined parameter value. According to another embodiment the predetermined parameter value is a pH value, wherein the pH value is from 5.5 to 9, preferably from 7 to 8.5.

According to one embodiment the micronized calcium carbonate is used for remineralization of water, wherein the remineralized water is selected from drinking water, recreation water such as water for swimming pools, industrial water for process applications, irrigation water, or water for aquifer or well recharge.

The term "alkalinity (TAC)" as used in the present invention is a measure of the ability of a solution to neutralize acids to the equivalence point of carbonate or bicarbonate. The alkalinity is equal to the stoichiometric sum of the bases in solution and is specified in mg/l as $CaCO_3$. The alkalinity may be measured with a titrator.

For the purpose of the present invention the term "calcium concentration" refers to the total calcium content in the solution and is specified in mg/l as $Ca^{2+}$ or as $CaCO_3$. The concentration may be measured with a titrator.

"Conductivity" in the meaning of the present invention is used as an indicator of how salt-free, ion-free, or impurity-free the measured water is; the purer the water, the lower the conductivity. The conductivity can be measured with a conductivity meter and is specified in μS/cm.

"Ground calcium carbonate (GCC)" in the meaning of the present invention is a calcium carbonate obtained from natural sources including marble, chalk, limestone or dolomite. Calcite is a carbonate mineral and the most stable polymorph of calcium carbonate. The other polymorphs of calcium carbonate are the minerals aragonite and vaterite. Aragonite will change to calcite at 380-470° C., and vaterite is even less stable. Ground calcium carbonate is processed through a treatment such as grinding, screening and/or fractionizing by wet and/or dry, for example, by a cyclone. It is known to the skilled person that ground calcium carbonate can inherently contain a defined concentration of magnesium, such as it is the case for dolomitic calcite.

The term "Langelier Saturation Index (LSI)" as used in the present invention describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$LSI=pH-pH_s,$$

wherein pH is the actual pH value of the aqueous liquid and $pH_s$ is the pH value of the aqueous liquid at $CaCO_3$ saturation. The $pH_s$ can be estimated as follows:

$$pH_s=(9.3+A+B)-(C+D),$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of $CaCO_3$, and D is the numerical value indicator of alkalinity of the aqueous liquid in mg/l of $CaCO_3$. The parameters A to D are determined using the following equations:

$$A=(\log_{10}(TDS)-1)/10,$$

$$B=-13.12\times\log_{10}(T+273)+34.55,$$

$$C=\log_{10}[Ca^{2+}]-0.4,$$

$$D=\log_{10}(TAC),$$

wherein TDS are the total dissolved solids in mg/l, T is the temperature in ° C., $[Ca^{2+}]$ is the calcium concentration of the aqueous liquid in mg/l of $CaCO_3$, and TAC is the alkalinity of the aqueous liquid in mg/l of $CaCO_3$.

The term "Silt Density Index (SDI)" as used in the present invention refers to the quantity of particulate matter in water and correlates with the fouling tendency of reverse osmosis or nanofiltration systems. The SDI can be calculated, e.g., from the rate of plugging of a 0.45 μm membrane filter when water is passed through at a constant applied water pressure of 208.6 kPa. The $SDI_{15}$ value is calculated from the rate of plugging of a 0.45 μm membrane filter when water is passed through at a constant applied water pressure of 208.6 kPa during 15 min. Typically, spiral wound reverse osmosis systems will need an SDI less than 5, and hollow fiber reverse osmosis systems will need an SDI less than 3.

The term "Modified Fouling Index (MFI)" as used in the present invention refers to the concentration of suspended matter and is a more accurate index than the SDI for predicting the tendency of a water to foul reverse osmosis or nano filtration membranes. The method that can be used for determining the MFI may be the same as for the SDI except that the volume is recorded every 30 seconds over a 15 minute filtration period. The MFI can be obtained graphically as the slope of the straight part of the curve when t/V is plotted against V (t is the time in seconds to collect a volume of V in liters). A MFI value of <1 corresponds to a SDI value of about <3 and can be considered as sufficiently low to control colloidal and particulate fouling.

In case an ultrafiltration (UF) membrane is used for MFI measurements, the index is called MFI-UF in contrast to the $MFI_{0.45}$ where a 0.45 μm membrane filter is used.

For the purpose of the present invention, the term "micronized" refers to a particle size in the micrometer range, e.g., a particle size from 0.1 to 100 μm. The micronized particles may be obtained by techniques based on friction, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis, or liquid foam synthesis.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ greater than 0.5 μm, a Sedigraph 5100 device from the company Micromeritics, USA can be used.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form.

"Modified calcium carbonate" in the meaning of the present invention is a surface-reacted natural calcium carbonate that is obtained by a process where natural calcium carbonate is reacted with one more acids having a p$K_a$ at 25° C. of 2.5 or less and with gaseous $CO_2$ formed in situ and/or coming from an external supply, and optionally in the presence of at least one aluminum silicate and/or at least one synthetic silica and/or at least one calcium silicate and/or at least one silicate of a monovalent salt such as sodium silicate and/or potassium silicate and/or lithium silicate, and/or at least one aluminum hydroxide and/or at least one sodium and/or potassium silicate. Further details about the preparation of the surface-reacted natural calcium carbonate are disclosed in WO 00/39222 and US 2004/0020410 A1, the contents of these references herewith being included in the present patent application.

The term "remineralization" as used in the present invention refers to the restoration of minerals in water not containing minerals at all or in a sufficient amount to obtain a water that is palatable. A remineralization can be achieved by adding at least calcium carbonate to the water to be treated. Optionally, e.g., for health-related benefits or to ensure the appropriate intake of some essential minerals and trace elements, further substances may be mixed to the calcium carbonate and then added to the water during the remineralization process. According to the national guidelines on human health and drinking water quality, the remineralized product may comprise additional minerals containing magnesium, potassium or sodium, e.g., magnesium carbonate, magnesium sulfate, potassium hydrogen carbonate, sodium hydrogen carbonate or other minerals containing essential trace elements.

For the purpose of the present invention, a "slurry" comprises insoluble solids and water and optionally further additives and usually contains large amounts of solids and, thus, is more viscous and generally of higher density than the liquid from which it is formed.

The term "total dissolved solids (TDS)" as used in the present invention is a measure of the combined content of all inorganic and organic substances contained in a liquid in molecular, ionized or micro-granular (colloidal sol) suspended form. Generally the operational definition is that the solids must be small enough to survive filtration through a sieve the size of two micrometer. The total dissolved solids can be estimated with a conductivity meter and are specified in mg/l.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

The inventive process for remineralization of water comprises the steps of (a) providing feed water having a concentration of carbon dioxide of at least 20 mg/l, preferably in the range of 25 to 100 mg/l, and more preferably in a range of 30 to 60 mg/l, (b) providing an aqueous slurry comprising micronized calcium carbonate, and (c) combining the feed water of step (a) and the aqueous slurry of step (b) in order to obtain remineralized water.

The feed water to be is used in the inventive process can be derived from various sources. The feed water preferably treated by the process of the present invention is desalinated seawater, brackish water or brine, treated wastewater or natural water such as ground water, surface water or rainfall, and more preferably desalinated seawater, brackish water or brine, treated wastewater or ground water.

According to one embodiment of the present invention, the feed water can be pretreated. A pretreatment may be necessary, e.g., in case the feed water is derived from surface water, groundwater or rainwater. For example, to achieve the drinking water guidelines the water need to be treated through the use of chemical or physical techniques in order to remove pollutants such as organics and undesirable minerals. For example, ozonation can be used as a first pretreatment step, followed then by coagulation, flocculation, or decantation as a second treatment step. For example, iron (III) salts such as $FeClSO_4$ or $FeCl_3$, or aluminum salts such as $AlCl_3$, $Al_2(SO_4)_3$ or polyaluminium may used as flocculation agents. The flocculated materials can be removed from the feed water, e.g, by means of sand filters or multi-layered filters.

Further water purification processes that may be used to pretreat the feed water are described, e.g., in EP 1 975 310, EP 1 982 759, EP 1 974 807, or EP 1 974 806.

According to another exemplary embodiment of the present invention, sea water or brackish water is firstly pumped out of the sea by open ocean intakes or subsurface intakes such as wells, and then it undergoes physical pretreatments such as screens, sedimendation or sand removal process. Depending on the required water quality, additional treatment steps such as coagulation and flocculation may be necessary in order to reduce potential fouling on the membranes. The pretreated seawater or brackish water may then be distilled, e.g., using multiple stage flash, multiple effect distillation, or membrane filtration such as ultrafiltration or reverse osmosis, to remove the remaining particulates and dissolved substances.

The remineralization of the feed water is induced by combining the feed water having a concentration of carbon dioxide of at least 20 mg/l, preferably in a range of 25 to 100 mg/l, and more preferably in a range of 30 to 60 mg/l with the aqueous slurry comprising the micronized calcium carbonate. The combination of the feed water and the aqueous slurry can be achieved by common methods known to the skilled person, and for example, by injecting the aqueous slurry comprising the micronized calcium carbonate into the feed water The aqueous slurry that combined with the feed water comprises micronized calcium carbonate. According to one embodiment the concentration of calcium carbonate in the slurry is from 0.05 to 40 wt.-%, from 1 to 25 wt.-%, from 2 to 20 wt.-%, from 3 to 15 wt.-%, or from 5 to 10 wt.-% based on the total weight of the slurry. According to another embodiment the concentration of calcium carbonate in the slurry is from 10 to 40 wt.-%, from 15 to 30 wt.-%, or from 20 to 25 wt.-% based on the total weight of the slurry.

The micronized calcium carbonate possesses a particle size in the micrometer range. According to one embodiment, the micronized calcium has a particle size from 0.1 to 100 µm, from 0.5 to 50 µm, from 1 to 15 µm, 2 to 10 µm or from 3 to 5 µm or the calcium carbonate has a particle size from 1 to 50 µm, from 2 to 20 µm, preferably from 5 to 15 µm, most preferably 8 to 12 µm.

Examples for suitable calcium carbonates are ground calcium carbonate, modified calcium carbonate or precipitated calcium carbonate, or a mixture thereof. A natural ground calcium carbonate (GCC) may feature, e.g., one or more of marble, limestone, chalk, and/or dolomite. A precipitated calcium carbonate (PCC) may feature, e.g., one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral, and rhombohedral forms. A modified calcium carbonate may feature a natural ground or precipitated calcium carbonate with a surface and/or internal structure modification, e.g., the calcium carbonate may be treated or coated with a hydrophobising surface treatment agent such as, e.g., an aliphatic carboxylic acid or a siloxane. Calcium carbonate may be treated or coated to become cationic or anionic with, for example, a polyacrylate or polydadmac.

According to one embodiment of the present invention, the micronized calcium carbonate is a ground calcium carbonate (GCC). According to a preferred embodiment, the micronized calcium carbonate is a ground calcium carbonate having a particle size from 3 to 5 μm, or 8 to 12 μm.

According to another embodiment of the present invention, the micronized calcium carbonate comprises a HCl insoluble content from 0.02 to 2.5 wt.-%, 0.05 to 1.5 wt.-%, or 0.1 to 0.6 wt.-% based on the total weight of the micronized calcium carbonate. Preferably, the HCl insoluble content of the micronized calcium carbonate does not exceed 0.6 wt.-% based on the total weight of the micronized calcium carbonate. The HCl insoluble content may be, e.g., minerals such as quartz, silicate or mica.

In addition to the micronized calcium carbonate, the slurry can comprise further micronized minerals. According to one embodiment, the slurry can comprise micronized magnesium carbonate, calcium magnesium carbonate, e.g. dolomitic limestone, calcareous dolomite, dolomite or half-burnt dolomite; magnesium oxide such as burnt dolomite, magnesium sulfate, potassium hydrogen carbonate, sodium hydrogen carbonate or other minerals containing essential trace elements.

According to one embodiment of the present invention, the slurry is freshly prepared by mixing water and the micronized calcium carbonate. The on-site preparation of the slurry may be preferred since premixed slurries may require the addition of further agents such as stabilizers or biocides, which may be unwanted compounds in the remineralized water. According to one preferred embodiment of the present invention, the time period between the preparation of the slurry and the injection of the slurry is short enough to avoid bacterial growth in the slurry. According to one exemplary embodiment, the time period between the preparation of the slurry and the injection of the slurry is less than 48 hours, less than 24 hours, less than 12 hours, less than 5 hours, less than 2 hours or less than 1 hour. According to another embodiment of the present invention, the injected slurry meets the microbiological quality requirements specified by the national guidelines for drinking water.

The slurry can be prepared, for example, using a mixer such as a mechanical stirrer for dilute slurries, or a specific powder-liquid mixing device for more concentrate slurries. Depending on the concentration of the prepared slurry the mixing time may be from 0.5 to 30 min, from 1 to 20 min, from 2 to 10 min, or from 3 to 5 min. According to one embodiment of the present invention, the slurry is prepared using a mixing machine, wherein the mixing machine enables simultaneous mixing and dosing of the slurry.

The water used to prepare the slurry can be, e.g., distilled water, feed water or industrial water.

According to one embodiment the slurry comprising micronized calcium carbonate is injected directly into a stream of feed water. For example, the slurry can be injected into the feed water stream at a controlled rate by means of a pump communicating with a storage vessel for the slurry. Preferably, the slurry may be injected into the feed water stream at a rate of 1 to 10 liter per cubic meter of feed water depending on the slurry concentration. According to another embodiment the slurry comprising micronized calcium carbonate is mixed with the feed water in a reaction chamber, e.g., using a mixer such as a mechanical stirrer. According to still another embodiment the slurry is injected in a tank receiving the entire flow of feed water.

According to one embodiment of the present invention, only a part of the feed water is remineralized by injecting the slurry, and subsequently, the remineralized water is blended with untreated feed water. Optionally, only a part of the feed water is remineralized to a high calcium carbonate concentration in comparison with the final target values, and subsequently, the remineralized water is blended with untreated feed water.

According to another embodiment the treated water or part of the treated water is filtered, e.g., by ultra filtration, to further reduce the turbidity level of the remineralized water.

According to one embodiment of the present invention, the slurry is injected in such an amount that complete dissolution of the calcium carbonate is achieved.

The amount of calcium carbonate injected into the feed water is selected in such way so as to give a water of desired quality. For example the quality of the remineralized water can be assessed by the Langelier Saturation Index (LSI). According to one embodiment, the remineralized water has a Langelier Saturation Index from −2 to 1, preferably from −1.9 to 0.9, and most preferably from −0.9 to 0. According to another embodiment, the remineralized water has a Slit Density Index $SDI_{15}$ below 5, preferably below 4, and most preferred below 3. According to still another embodiment the remineralized water has a Membrane Fouling Index $MFI_{0.45}$ below 4, preferably below 2.5, most preferred below 2. The assessment can be done, e.g., by measuring the pH of the treated feed water continuously. Depending on the remineralization system, the pH of the treated pH can be measured, e.g., in a stream of treated water, in a reaction chamber, wherein the slurry and the feed water is mixed, or in a storage tank for the remineralized water. According to one embodiment of the present invention, the pH is measured 30 min, 20 min, 10 min, 5 min or 2 min after the remineralization step. The measurement of the pH value may be done at room temperature, i.e. at about 20° C.

According to one exemplary embodiment of the invention, the amount of the injected slurry is controlled by detecting the pH value of the treated feed water. Alternatively or additionally, the amount of injected slurry is controlled by detecting parameters such as alkalinity, total hardness, conductivity, $CO_2$ concentration, pH, calcium concentration, total dissolved solids, or turbidity. According to one embodiment, the process of the present invention further comprises the steps of (d) measuring a parameter value of the remineralized water, wherein the parameter is selected from the group comprising alkalinity, total hardness, conductivity, calcium concentration, pH, $CO_2$ concentration, total dissolved solids, or turbidity of the remineralized water, (e) comparing the measured parameter value with a predetermined parameter value, and (f) providing the amount of injected slurry on the basis of the difference between the measured and the predetermined parameter value.

According to one embodiment, the predetermined parameter value is a pH value, wherein the pH value is from 5.5 to 9, preferably from 7 to 8.5.

Figure 1:
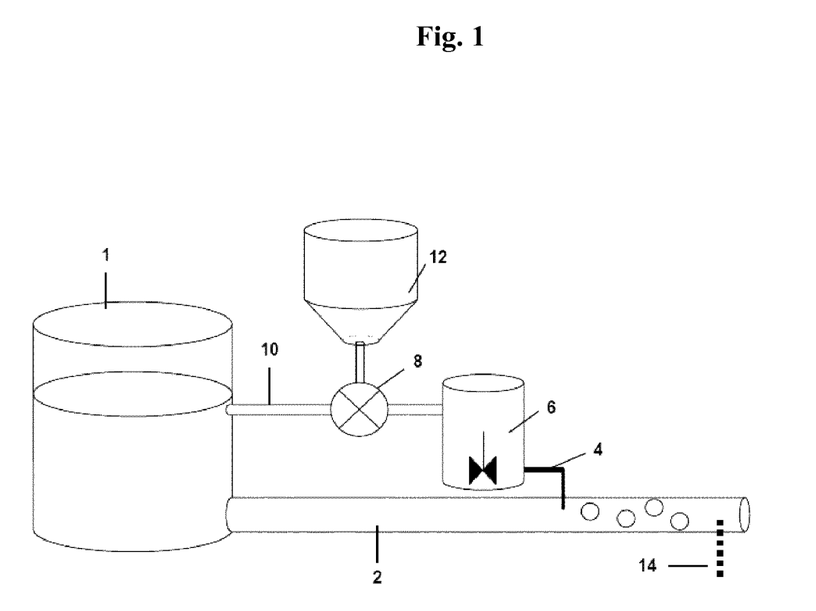

FIG. 1 shows a scheme of an apparatus that can be used for operating the inventive method. Feed water flows from a reservoir (1) into a pipeline (2). An inlet (4) is located downstream the pipeline (2) through which the slurry comprising micronized calcium carbonate is injected into the feed water stream from a storage tank (6) for the slurry. The slurry is prepared on-site using a suitable mixer (8) by mixing water that is obtained from the reservoir (1) via a pipe (10) and micronized calcium carbonate obtained from a storage container (12). The pH of the remineralized water can be measured downstream of the slurry inlet (10) on a sample point (14). According to one embodiment the flow rate of the feed water is 20 000 and 500 000 m³ per day.

The inventive process may be used to produce drinking water, recreation water such as water for swimming pools, industrial water for process applications, irrigation water, or water for aquifer or well recharge.

According to one embodiment, the carbon dioxide and calcium carbonate concentrations in the remineralized water meet the required values for drinking water quality, which are set by national guidelines. According to one embodiment the remineralized water obtained by the inventive process has a calcium concentration from 15 to 200 mg/l as $CaCO_3$, preferably from 50 to 150 mg/l as $CaCO_3$, and most preferred from 100 to 125 mg/l as $CaCO_3$, or from 15 to 100 mg/l, preferably from 20 to 80 mg/l, and most preferably from 40 to 60 mg/l. In case the slurry comprises a further magnesium salt such as magnesium carbonate, or magnesium sulfate, the remineralized water obtained by the inventive process may have a magnesium concentration from 5 to 25 mg/l, preferably from 5 to 15 mg/l, and most preferred from 8 to 12 mg/l.

According to one embodiment of the present invention the remineralized water has a turbidity of lower than 5.0 NTU, lower than 1.0 NTU, lower than 0.5 NTU, or lower than 0.3 NTU.

According to one exemplary embodiment of the present invention the remineralized water has a LSI from −0.9 to +0.0, a calcium concentration from 15 to 200 mg/l, a magnesium concentration from 5 to 25 mg/l, an alkalinity between 20 and 100 mg/l as $CaCO3$, a pH between 7 and 8.5, and a turbidity of lower than 1.0 NTU.

According to one embodiment of the present invention a step of particle removal is carried out after mineralization, e.g., to reduce the turbidity level of the remineralized water. It is also possible to carry out a particle removal step before the injection of the slurry, e.g., to reduce the turbidity level of the feed water or part of the feed water. According to one embodiment a sedimentation step is carried out. For example, the feed water and/or remineralized water may be piped into a clarifier or storage tank to further reduce the turbidity level of the water. According to another embodiment the particles may be removed by decantation. Alternatively, at least a part of the feed water and/or remineralized water may be filtered, e.g., by ultra filtration, to further reduce the turbidity level of the water.

The invention will now be described in detail by the following examples.

EXAMPLES

Measurement Methods $CO_2$ Measurement

The concentration of carbon dioxide contained in the feed water samples used was determined by using a titrimetric method. The principle of this method consists in the fact that $CO_2$ reacts with sodium carbonate or sodium hydroxide to form sodium bicarbonate ($NaHCO_3$). The completion of the reaction is indicated potentiometrically or by the development of the pink colour characteristic of phenolphthalein indicator at the equivalence pH of 8.3

The titration of the feed water was conducted at 25° C. using a Mettler Toledo M 416.

A three point calibration (according to the segment method) of the instrument was first made using commercially available buffer solutions (from Mettler Toledo) having pH values of 4.01, 7.00 and 9.21.

Then the pH of a 100 ml sample of the feed water was measured in function of the amount of titrant used until the end-point of pH 8 was reached. In the present measurement the titrant was a 0.01 mol/l sodium hydroxide solution.

From the amount of titrant that was necessary to reach the end-point of pH 8.3, and using the following equation (I), the $CO_2$ content can be easily calculated.

$$\text{mg } CO_2/L = \frac{A \times N \times 44000}{b} \quad (I)$$

where:
A=ml titrant, N=normality of NaOH, and b=ml sample.

Formula (I) is described in Chapter 4500-$CO_2$ Carbon Dioxide on pages 4-28 to 4-34 of "Standard Methods for the Examination of Water & Wastewater, 21$^{st}$ Edition, 2005, prepared and published jointly by the American Public Health Association, American Water Works Association, Water Environment Federation, publication office American Public Health Association 800 I Street, NW, Washington, D.C. 20001-3710, Centennial Edition". Therefrom it can be derived that the $CO_2$ contents given in the present invention refer to the content of free $CO_2$ in the water.

BET Specific Surface Area

The BET specific surface area (also designated as SSA) was determined according to ISO 9277 using a Tristar II 3020 sold by the company MICROMERITICS™.

Particle Size Distribution (Mass % Particles with a Diameter <X μm) and Weight Median Particle Diameter ($d_{50}$) of Particulate Material ($d_{50}$ (μm))

Sedigraph™ 5100

The weight median particle diameter and the particle diameter mass distribution of a particulate material were determined via the sedimentation method, i.e. an analysis of sedimentation behavior in a gravimetric field. The measurement is made with a Sedigraph™ 5100 sold by the company MICROMERITICS™.

The method and the instrument are known to the skilled person and are commonly used to determine particle size of fillers and pigments. Samples were prepared by adding an amount of the product corresponding to 4 g dry PCC to 60 ml of an aqueous solution of 0.1% by weight of $Na_4P_2O_7$. The samples were dispersed for 3 minutes using a high speed stirrer (Polytron PT 3000/3100 at 15,000 rpm). Then it was submitted to ultrasound using an ultrasonic bath for 15 minutes and thereafter added to the mixing chamber of the Sedigraph.

Weight Solids (% by Weight) of a Material in Suspension

The weight solids (also called solids content of a material) was determined by dividing the weight of the solid material by the total weight of the aqueous suspension.

The weight of the solid material was determined by weighing the solid material obtained by evaporating the aqueous phase of the suspension and drying the obtained material to a constant weight.

The micronized products used to prepare the slurries of the present invention consisted of several micronized carbonate rocks:

a marble calcium carbonate with an HCl insoluble content of 1.5 wt.-% from Bathurst, Australia, with $d_{50}$=2.8 µm (sample A), a marble calcium carbonate with an HCl insoluble content of 0.1 wt.-% from Salses, France, with two different particle sizes $d_{50}$=5.5 µm (sample D), and $d_{50}$=3.5 µm (sample E), a limestone calcium carbonate with an HCl insoluble content of 0.7 wt.-% from Superior, Ariz. (sample F: $d_{50}$=3.5 µm), a marble calcium carbonate with an HCl insoluble content of 1.0 wt.-% from Lucerne Valley, Calif. (sample J: $d_{50}$=2.0 µm)

a limestone calcium carbonate with an HCl insoluble content of 0.1 wt.-% from Orgon, France (sample K: $d_{50}$=3.0 µm)

Table 1 summaries the different products used during the remineralization tests

TABLE 1

| Samples | Calcium carbonate rock | $d_{50}$ (µm) | HCl insoluble (%) |
|---|---|---|---|
| A | Marble | 2.8 | 1.5 |
| D | Marble | 5.5 | 0.2 |
| E | Marble | 3.5 | 0.2 |
| F | Limestone | 3.5 | 0.7 |
| J | Marble | 2.0 | 1.0 |
| K | Limestone | 3.0 | 0.1 |

Membrane Fouling Index (MFI) and Langelier Saturation Index (LSI) During Remineralization of the RO Water:

Permeate produced by desalination processes is corrosive to concrete and metal because of its low pH and LSI value. If the permeate is not stabilized it leaches calcium from unprotected concrete in the storage tanks, wells and corrodes the cement-mortar lined ductile iron pipe commonly used for water distribution. At the majority of advanced water and wastewater treatment facilities permeate is stabilized by the addition of chemicals such as lime.

However, the dosing of chemicals for post-treatment may result in high turbidity (>0.2 NTU) and elevated particulate levels (high Modified Fouling Index, e.g. in the 2-15 units range) in the final treated water, thereby increasing the potential for fouling of the injection wells.

For indirect potable use, injection to barrier wells for seawater intrusion control it is specified that the permeate water turbidity shall be <0.2 NTU units and the modified fouling index (MFI) shall be <2.0 units.

The feed water used for the remineralization tests of the present examples was obtained from a reverse osmosis desalination process of two different sewage plants (Plant 1 and Plant 2) and had the following parameters:

| Parameter | Plant 1 | Plant 2 |
|---|---|---|
| pH | 5.58 | 5.54 |
| Alkalinity (mg/L as $CaCO_3$) | 21.0 | 9.0 |
| $Ca^{2+}$ Hardness (mg/L) | 0.8 | 0.8 |
| $CO_2$ (mg/L) | 35.0 | 45.0 |
| Turbidity (NTU) | 0.3 | 0.2 |
| TDS (mg/L) | 12.6 | 6.7 |
| LSI | −5.0 | −5.3 |
| MFI | 0.1 | 0.3 |

The RO permeate remineralization tests were performed using 2-liter cubic jars with the aim of increasing the hardness of the RO water, e.g. 0.8 mg/L as $CaCO_3$, up to the target of around 50 mg/L as $CaCO_3$.

Different types of micronized calcium carbonate (samples A, D, E, F, J and K) were tested for MFI and LSI analyses. The solid content of the $CaCO_3$ slurries was 3.5 wt %, based on the weight of the micronized calcium carbonate. An appropriate dose of the $CaCO_3$ slurries was added to achieve the desired water quality. The stabilized finished water should reach the following quality requirements:

| Parameter | Value |
|---|---|
| pH | 6.5 to 8.5 |
| Alkalinity, mg/L as $CaCO_3$ | 40 to 80 |
| Calcium, mg/L | 10 to 50 |
| LSI | −0.5 to 0.0 |
| Turbidity, NTU | <0.2 |
| MFI | <2.0 |

After adding the $CaCO_3$ slurry, the samples were allowed to mix for 4 hours and samples collected at 10, 20, 30, 60, 120, and 240 minutes. Turbidity, pH, total alkalinity, and calcium hardness was measured at the individual sampling times. Equilibrium time was determined as the time when the turbidity stabilized. After the equilibrium time was reached, LSI was calculated and MFI measured.

Table 2 shows the different results obtained for the remineralization of two different RO waters after the addition of approximately 50 mg/L as $CaCO_3$ using 3.5 wt % $CaCO_3$ slurries, based on the weight of the micronized calcium carbonate.

TABLE 2

| $CaCO_3$ slurries | RO water supply | Equilibrium time (min) | pH | Alkalinity (mg/L $CaCO_3$) | Turbidity (NTU) | LSI (units) | MFI (units) |
|---|---|---|---|---|---|---|---|
| Sample J (marble, $d_{50}$ = 2.0 µm) | Plant 1 | 120 | 7.6 | 49 | 1.3 | −1.2 | 1.6 |
| Sample F (limestone, $d_{50}$ = 3.5 µm) | Plant 1 | 120 | 7.5 | 49 | 0.7 | −0.88 | 1.9 |
| Sample J (marble, $d_{50}$ = 2.0 µm) | Plant 2 | 120 | 7.8 | 41 | 1.3 | −0.88 | 1.3 |
| Sample F (limestone, $d_{50}$ = 3.5 µm) | Plant 2 | 120 | 7.8 | 43 | 1.7 | −1.02 | 1.7 |
| Sample K (limestone, $d_{50}$ = 3.0 µm) | Plant 2 | 120 | 7.9 | 44 | 0.5 | −1.61 | 0.1 |

TABLE 2-continued

| CaCO₃ slurries | RO water supply | Equilibrium time (min) | pH | Alkalinity (mg/L CaCO₃) | Turbidity (NTU) | LSI (units) | MFI (units) |
|---|---|---|---|---|---|---|---|
| Sample E (marble, $d_{50}$ = 3.5 μm) | Plant 2 | 120 | 7.9 | 43 | 0.9 | −1.8 | 0.62 |
| Sample D (marble, $d_{50}$ = 5.5 μm) | Plant 2 | 120 | 7.9 | 41 | 1.2 | −1.7 | 0.5 |
| Sample A (marble, $d_{50}$ = 2.8 μm) | Plant 2 | 120 | 8.0 | 48 | 1.4 | −1.85 | 1.9 |

As it can be taken from Table 2, the use of micronized calcium carbonate products for the remineralization of RO water met the water quality requirements for pH, total alkalinity, calcium hardness, and MFI for all performed tests. The micronized calcium carbonate products presented turbidity level between 0.5 and 1.7 NTU, and LSI values between −1.85 and −0.88. Based on turbidity measurements with respect to time, equilibrium time required for dissolution of calcium carbonate products was approximately 120 minutes.

The invention claimed is:

1. A process for remineralization of feed water comprising the steps of:
   a) providing feed water in need of remineralization, wherein the feed water has a concentration of free carbon dioxide of 20 to 60 mg/l that is not a result of addition of gaseous carbon dioxide to the feed water,
   b) providing an aqueous slurry comprising 2 to 40 wt.-% of micronized calcium carbonate based on the total weight of the slurry, wherein the micronized calcium carbonate has a particle size from 0.5 to 15 μm, and a HCl insoluble content from 0.02 to 2.5 wt.-% based on the total weight of the micronized calcium carbonate, and
   c) combining the feed water of step a) and the aqueous slurry of step b) in order to obtain remineralized water.

2. The process according to claim 1, wherein the feed water has a concentration of carbon dioxide of 30 to 60 mg/l.

3. The process of claim 1, wherein the concentration of calcium carbonate in the slurry is from 2 to 25 wt.-%, based on the total weight of the slurry.

4. The process of claim 1, wherein the concentration of calcium carbonate in the slurry is from 2 to 20 wt.-%, based on the total weight of the slurry.

5. The process of claim 1, wherein the concentration of calcium carbonate in the slurry is from 3 to 15 wt.-%, based on the total weight of the slurry.

6. The process of claim 1, wherein the calcium carbonate has a particle size from 2 to 10 μm.

7. The process of claim 1, wherein the calcium carbonate has a particle size from 3 to 5 μm.

8. The process of claim 1, wherein the calcium carbonate has a HCl insoluble content from 0.05 to 1.5 wt.-%, based on the total weight of the micronized calcium carbonate.

9. The process of claim 1, wherein the calcium carbonate has a HCl insoluble content from 0.1 to 0.6 wt.-%, based on the total weight of the micronized calcium carbonate.

10. The process of claim 1, wherein the calcium carbonate is a ground calcium carbonate, modified calcium carbonate, or precipitated calcium carbonate, or any mixture thereof.

11. The process of claim 1, wherein the slurry comprises further minerals containing magnesium, potassium, sodium, magnesium carbonate, calcium magnesium carbonate, dolomitic limestone, calcareous dolomite, dolomite, half-burnt dolomite, magnesium oxide, burnt dolomite, magnesium sulfate, potassium hydrogen carbonate, or sodium hydrogen carbonate.

12. The process of claim 1, wherein the time period between the preparation of the slurry in step b) and combining the slurry with the feed water in step c is less than 24 hours.

13. The process of claim 1, wherein the time period between the preparation of the slurry in step b) and combining the slurry with the feed water in step c is less than 2 hours.

14. The process of claim 1, wherein the obtained remineralized water has a calcium concentration as calcium carbonate from 15 to 200 mg/l.

15. The process of claim 1, wherein the obtained remineralized water has a calcium concentration as calcium carbonate from 50 to 150 mg/l.

16. The process of claim 1, wherein the obtained remineralized water has a calcium concentration as calcium carbonate from 100 to 125 mg/l.

17. The process of claim 1, wherein the obtained remineralized water has a calcium concentration as calcium carbonate from 15 to 100 mg/l.

18. The process of claim 1, wherein the obtained remineralized water has a calcium concentration as calcium carbonate from 20 to 80 mg/l.

19. The process of claim 1, wherein the obtained remineralized water has a calcium concentration as calcium carbonate from 40 to 60 mg/l.

20. The process of claim 1, wherein the slurry comprises further minerals containing magnesium and the obtained remineralized water has a magnesium concentration from 5 to 25 mg/l.

21. The process of claim 1, wherein the remineralized water has a turbidity value of lower than 5.0 NTU.

22. The process of claim 1, wherein the remineralized water has a turbidity value of lower than 1.0 NTU.

23. The process of claim 1, wherein the remineralized water has a turbidity value of lower than 0.5 NTU.

24. The process of claim 1, wherein the remineralized water has a turbidity value of lower than 0.3 NTU.

25. The process of claim 1, wherein the remineralized water has one or more of a Langlier Saturation Index from −2 to 1, a Slit Density Index $SDI_{15}$ below 5, and a Membrane Fouling Index $MFI_{0.45}$ below 4.

26. The process of claim 1, wherein the remineralized water has one or more of a Langlier Saturation Index from −1.9 to 0.9, a Slit Density Index $SDI_{15}$ below 4, and a Membrane Fouling Index $MFI_{0.45}$ below 2.5.

27. The process of claim 1, wherein the remineralized water has one or more of a Langlier Saturation Index from −0.9 to 0, a Slit Density Index $SDI_{15}$ below 3, and a Membrane Fouling Index $MFI_{0.45}$ below 2.

28. The process of claim 1, wherein the feed water is desalinated seawater, brackish water, brine, treated wastewater, natural water, ground water, surface water or rainfall.

29. The process according to claim 1, wherein the remineralized water is blended with feed water.

30. The process according to claim 1, wherein the process further comprises a particle removal step.

31. The process according to claim 1, wherein one or more of a alkalinity, conductivity, calcium concentration, pH, total dissolved solids and turbidity is measured and compared to a predetermined parameter value, and the amount of slurry is adjusted based on the difference between the measured and the predetermined parameter value.

32. The process of claim 31, wherein the predetermined parameter value is a pH value, wherein the pH value is from 5.5 to 9.

33. The process of claim 31, wherein the predetermined parameter value is a pH value, wherein the pH value is from 7 to 8.5.

* * * * *